US012762652B2

(12) United States Patent
Singh

(10) Patent No.: US 12,762,652 B2
(45) Date of Patent: Oct. 13, 2026

(54) METHODS AND SYSTEMS FOR DUAL-ENERGY SUBTRACTION IMAGES

(71) Applicant: GE Precision Healthcare LLC, Waukesha, WI (US)

(72) Inventor: ManMohan Singh, Brookfield, WI (US)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 376 days.

(21) Appl. No.: 18/360,649

(22) Filed: Jul. 27, 2023

(65) Prior Publication Data

US 2025/0037241 A1 Jan. 30, 2025

(51) Int. Cl.
*G06T 5/50* (2006.01)
*G06V 10/25* (2022.01)

(52) U.S. Cl.
CPC ................ *G06T 5/50* (2013.01); *G06V 10/25* (2022.01); *G06T 2207/10081* (2013.01); *G06T 2207/20224* (2013.01)

(58) Field of Classification Search
CPC ............. G06T 5/50; G06T 2207/10081; G06T 2207/20224; G06T 2211/408; G06T 11/008; G06V 10/25; A61B 6/482; A61B 6/5258; G01N 23/087; G01V 5/224
See application file for complete search history.

(56) References Cited

U.S. PATENT DOCUMENTS 9,036,886 B2 5/2015 Hsieh et al.
9,547,894 B2 1/2017 Razeto et al.
2004/0101090 A1* 5/2004 Drummond ............ A61B 6/504 378/4
2012/0134561 A1* 5/2012 Xu ............................ G06T 5/70 382/131
2014/0363069 A1* 12/2014 Hsieh ........................ G06T 5/77 382/131
2016/0000396 A1* 1/2016 Taguchi .................... G06T 5/70 382/131
2016/0371862 A1* 12/2016 Silver .................... A61B 6/504

(Continued)

OTHER PUBLICATIONS

Dunet, V. et al., "Impact of metal artifact reduction software on image quality of gemstone spectral imaging dual-energy cerebral CT angiography after intracranial aneurysm clipping," Neuroradiology, vol. 59, No. 9, Sep. 2017, Available Online Jul. 27, 2017, 8 pages.

(Continued)

*Primary Examiner* — Atiba O Fitzpatrick
(74) *Attorney, Agent, or Firm* — McCoy Russell LLP

(57) ABSTRACT

Various methods and systems are provided for reducing beam hardening artifacts and metal artifacts present in images generated with a dual-energy computed tomography (CT) scan protocol. In one embodiment, a method may include obtaining projection data of a region of interest (ROI) of a subject, the projection data acquired at two different x-ray tube energy levels, generating a first monoenergetic image at a first energy level from the projection data, generating a second monoenergetic image at a second energy level from the projection data, subtracting the first monoenergetic image from the second monoenergetic image to obtain a subtracted image, and outputting the subtracted image for display and/or storage.

16 Claims, 11 Drawing Sheets

(56) References Cited

U.S. PATENT DOCUMENTS

| | | | | |
|---|---|---|---|---|
| 2018/0082420 | A1* | 3/2018 | Brown | G06T 7/0016 |
| 2019/0038918 | A1* | 2/2019 | Lu | A61B 6/4241 |
| 2019/0167218 | A1* | 6/2019 | Hsieh | A61B 6/482 |
| 2019/0290221 | A1* | 9/2019 | Smith | A61B 6/466 |
| 2021/0056688 | A1* | 2/2021 | Xu | G06T 11/008 |
| 2021/0128095 | A1* | 5/2021 | Vaz | A61B 6/481 |
| 2021/0259649 | A1* | 8/2021 | Milioni De Carvalho | G06T 7/337 |
| 2021/0369219 | A1* | 12/2021 | Li | A61B 6/4241 |
| 2023/0011644 | A1* | 1/2023 | Zhao | A61B 6/5282 |
| 2023/0144823 | A1* | 5/2023 | Wiemker | G06T 11/008 382/131 |
| 2023/0200769 | A1* | 6/2023 | Fukuda | G06T 7/0016 378/37 |
| 2023/0218254 | A1* | 7/2023 | Fukuda | A61B 6/482 378/37 |
| 2023/0401677 | A1* | 12/2023 | Iwashita | H04N 25/30 |
| 2025/0186011 | A1* | 6/2025 | Machii | G06T 7/0012 |
| 2025/0191132 | A1* | 6/2025 | Yue | G06T 7/0016 |

OTHER PUBLICATIONS

Katsura, M. et al., "Current and Novel Techniques for Metal Artifact Reduction at CT: Practical Guide for Radiologists," RadioGraphics, vol. 38, No. 2, Mar. 12, 2018, 12 pages.

* cited by examiner

900

1000

METHODS AND SYSTEMS FOR DUAL-ENERGY SUBTRACTION IMAGES

FIELD

Embodiments of the subject matter disclosed herein relate to medical imaging, and more particularly, to computed tomography (CT).

BACKGROUND

In computed tomography (CT) imaging systems, an x-ray source emits an x-ray beam toward a subject or object, such as a patient. After attenuation by the subject, the x-ray beam impinges upon a detector array. An intensity of the attenuated beam radiation received at the detector array depends on upon attenuation of the x-ray beam by the subject. Each detector element of the detector array produces a separate electrical signal which is transmitted to a data processing system for analysis and generation of a medical image. CT scans may be prone to beam hardening artifacts when imaging a patient.

BRIEF DESCRIPTION

In one example, a method includes obtaining projection data of a region of interest (ROI) of a subject, the projection data acquired at two different x-ray tube energy levels, generating a first monoenergetic image at a first energy level from the projection data, generating a second monoenergetic image at a second energy level from the projection data, subtracting the first monoenergetic image from the second monoenergetic image to obtain a subtracted image, and outputting the subtracted image for display and/or storage.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

DETAILED DESCRIPTION

The following description relates to correcting metal artifacts present in images generated by a dual-energy spectral computed tomography (CT) system. In particular, systems and methods are provided for obtaining projection data of a region of interest (ROI) of a subject at two different energy levels, generating a first monoenergetic image at a first energy level and a second monoenergetic image at a second energy level from the projection data, the lower energy level and the higher energy level being different than the first energy level and the second energy level, and subtracting the two monoenergetic images to obtain a final image, which is output for display and/or storage.

When a metal component is positioned within a subject, such as a coil positioned in a brain aneurysm of the subject, images generated of the subject may include artifacts as a result of the metal, such as beam hardening artifacts, which may be referred to as metal artifacts. Metal artifacts may hinder accurate visualization of underlying and surrounding anatomical features of the subject proximate to the metal component. Hence, metal artifacts may result in a missed diagnosis, misdiagnosis, or hinder monitoring of a current diagnosis. In particular, metal artifacts due to the coil may hinder accurate visualization of underlying and surrounding vessels around the coil and within the coil itself, which in turn, hinders monitoring of the brain aneurysm.

Visualization of underlying and surrounding anatomical features of the subject proximate to the metal component may be increased by simulating a removal of the metal component and reducing the presence of metal artifacts within the generated images. Removal of the coil may be simulated by performing a dual-energy CT imaging protocol at two different x-ray tube energy levels following injection of contrast agent to obtain projection data and generating a first monoenergetic image at a first energy level from the projection data and a second monoenergetic image at a second, different energy level from the projection data, wherein the first energy level results in metal artifacts being retained in the first monoenergetic image and the second energy level results in reduced metal artifacts in the second monoenergetic image. By subtracting the first monoenergetic image from the second monoenergetic image, a subtracted image may be generated wherein the metal component is not present within the subtracted image. Since the metal component is not included in the subtracted image, the underlying and surrounding anatomical features of the subject may be accurately visualized. In this way, an existing diagnosis of the subject may be monitored and a frequency of missed diagnoses and misdiagnoses of the subject may be reduced.

Figure 1:
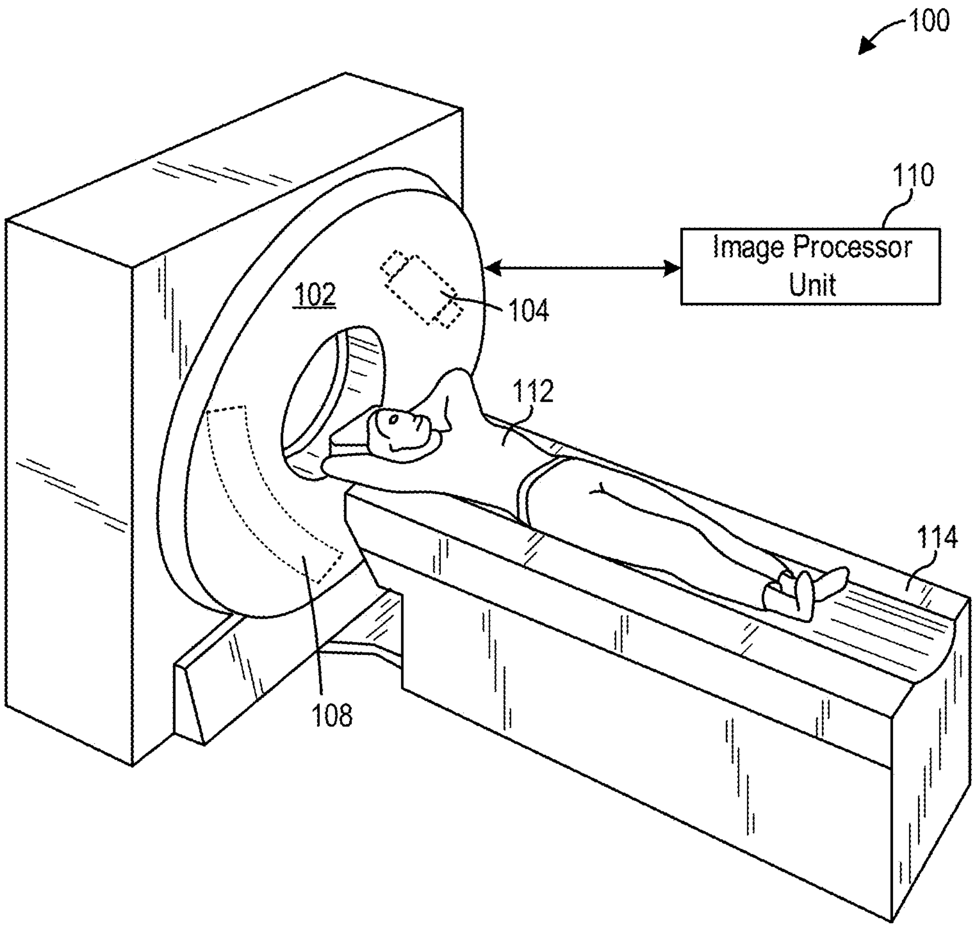
FIG. 1 shows a pictorial view of a CT imaging system that incorporates disclosed embodiments.
Figure 2:
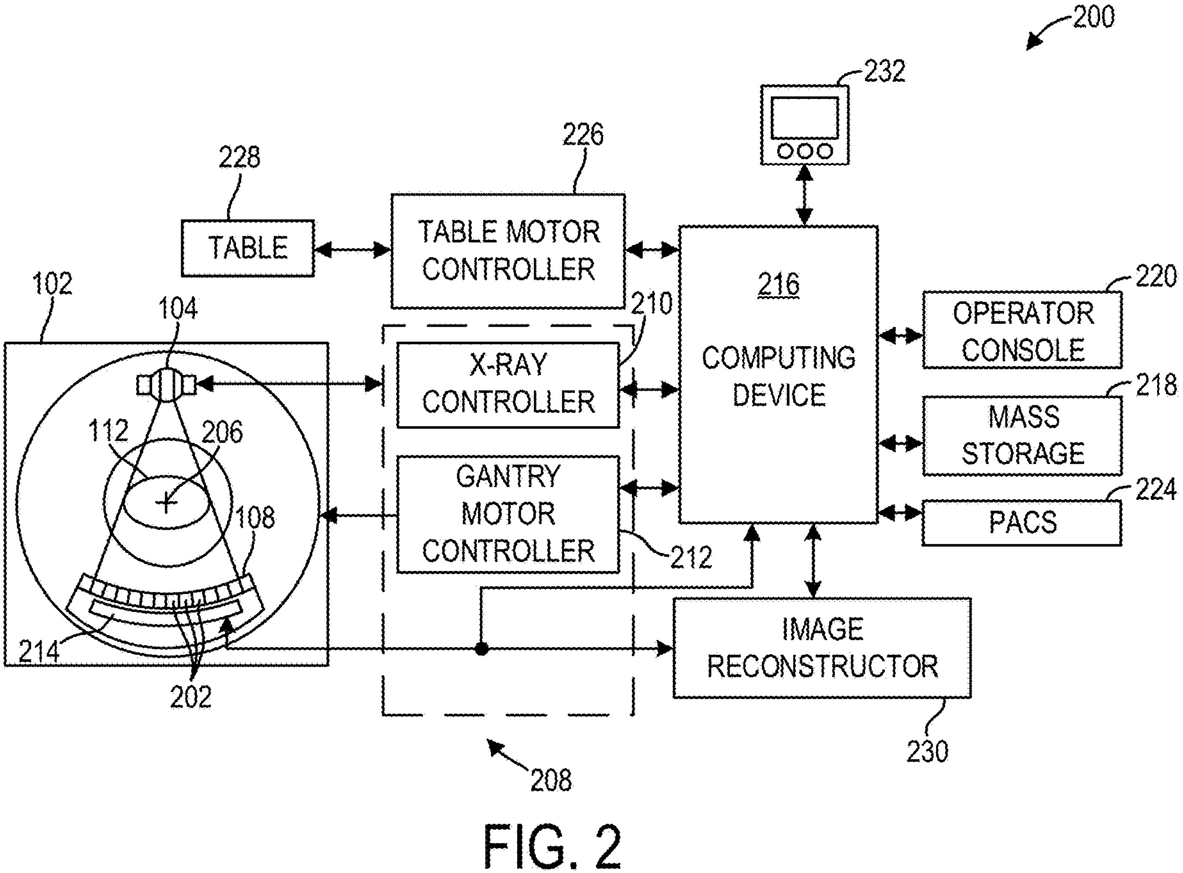
FIG. 2 shows a block schematic diagram of the system illustrated in FIG. 1.
Figure 3:
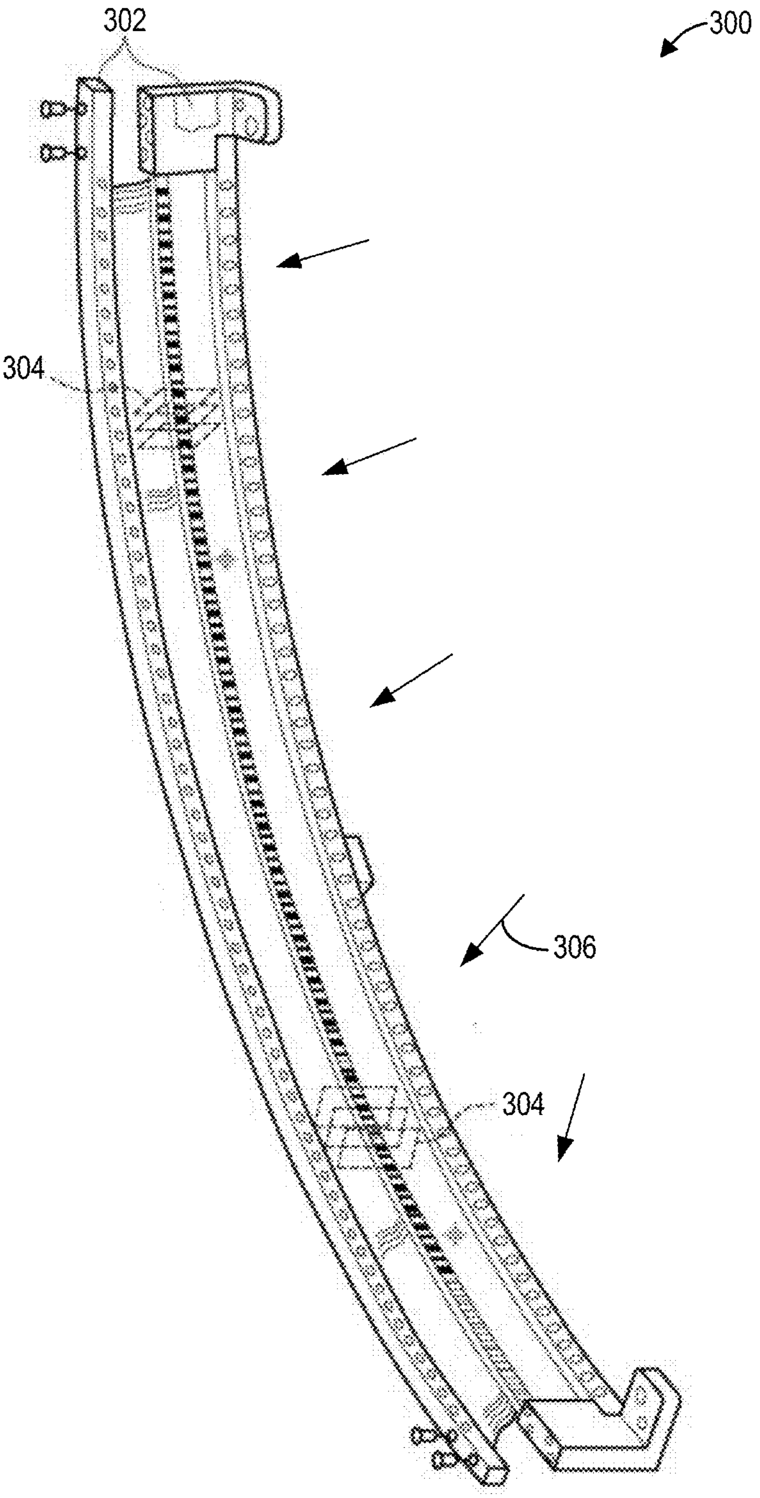
FIG. 3 shows a perspective view of an embodiment of a CT imaging system detector array.
Figure 4:
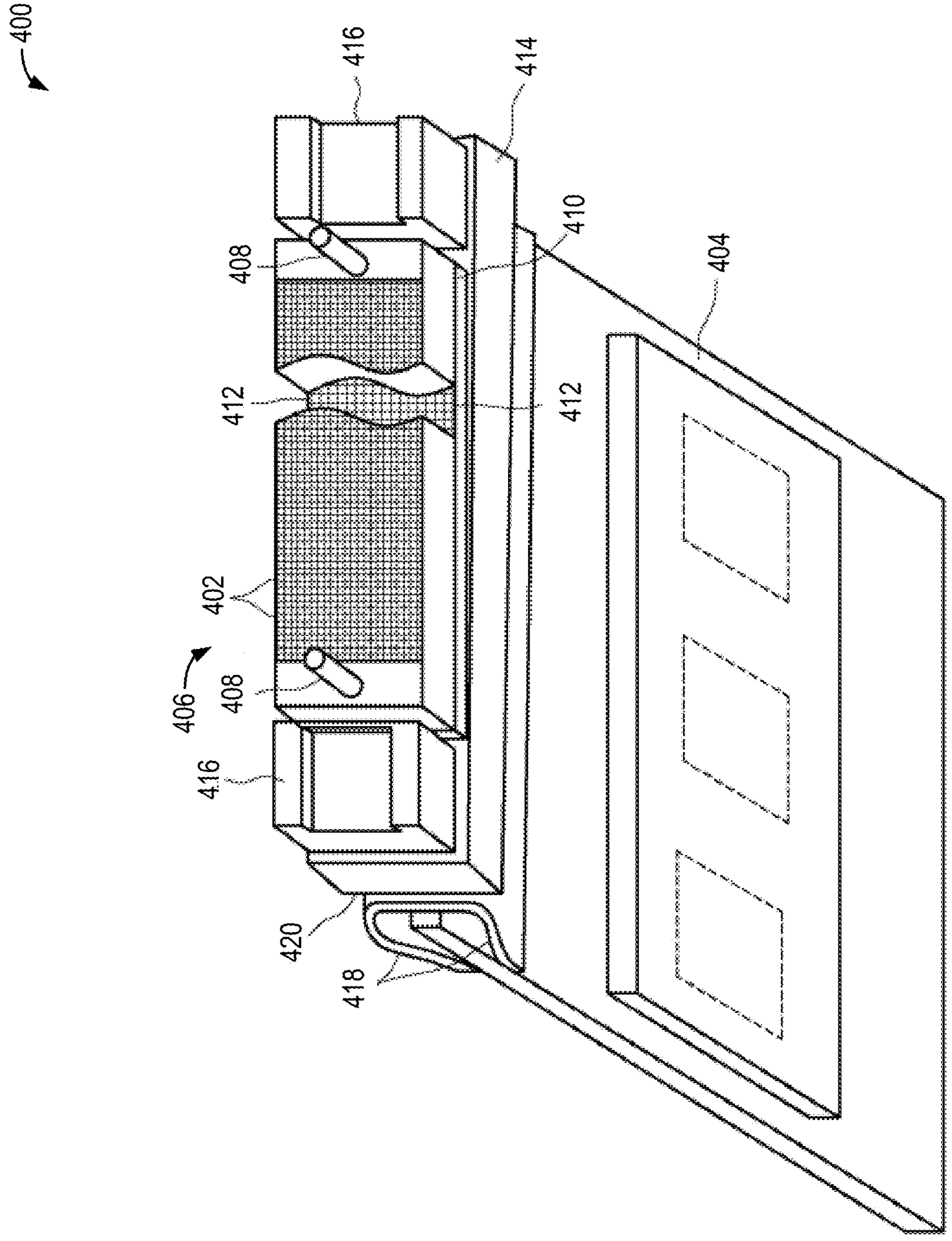
FIG. 4 shows a perspective view of an embodiment of a detector.
Figure 5:
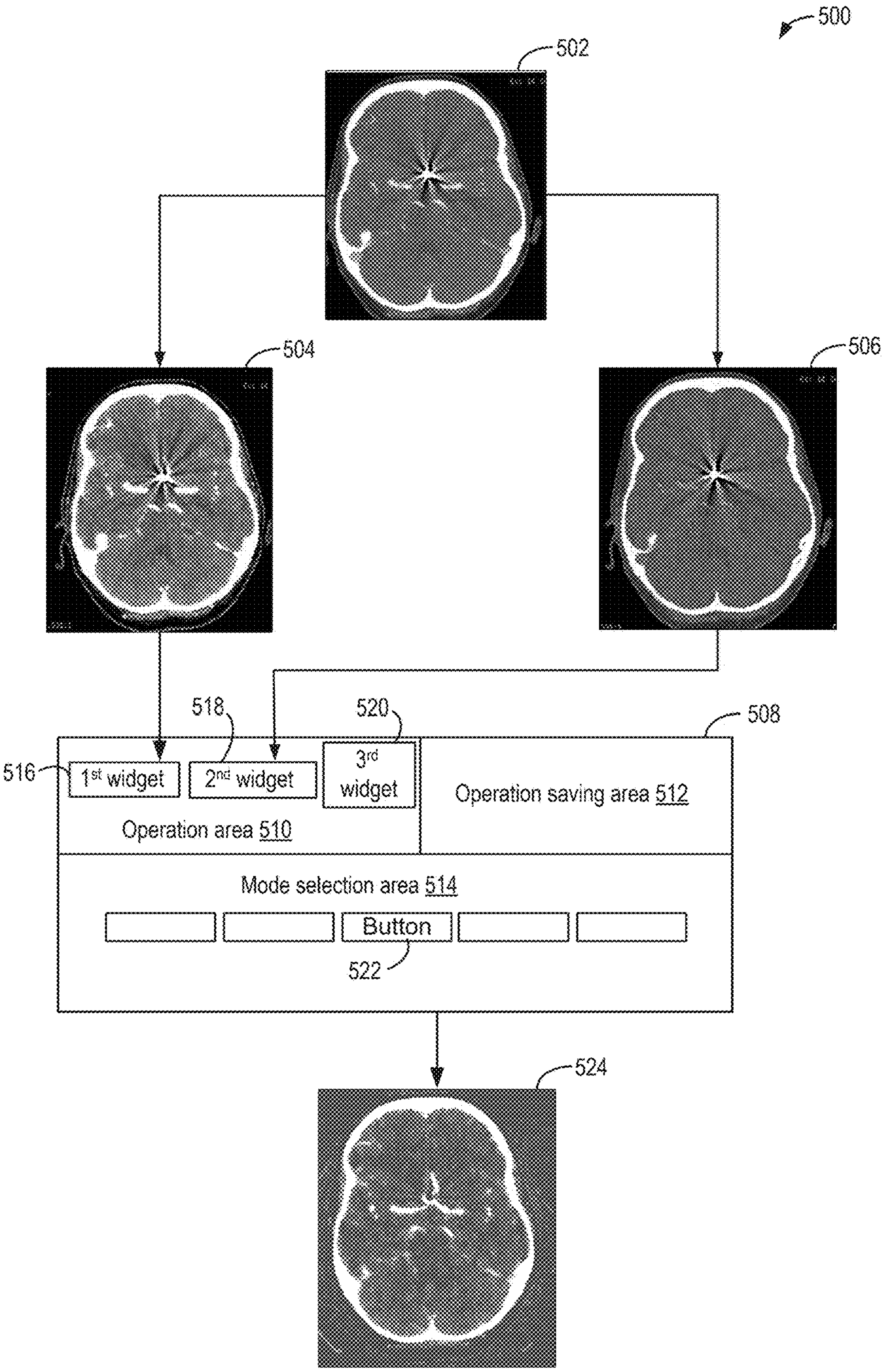
FIG. 5 shows a block schematic diagram of a process for reducing metal artifacts by subtracting two monoenergetic images at two different energy levels.
Figure 6:
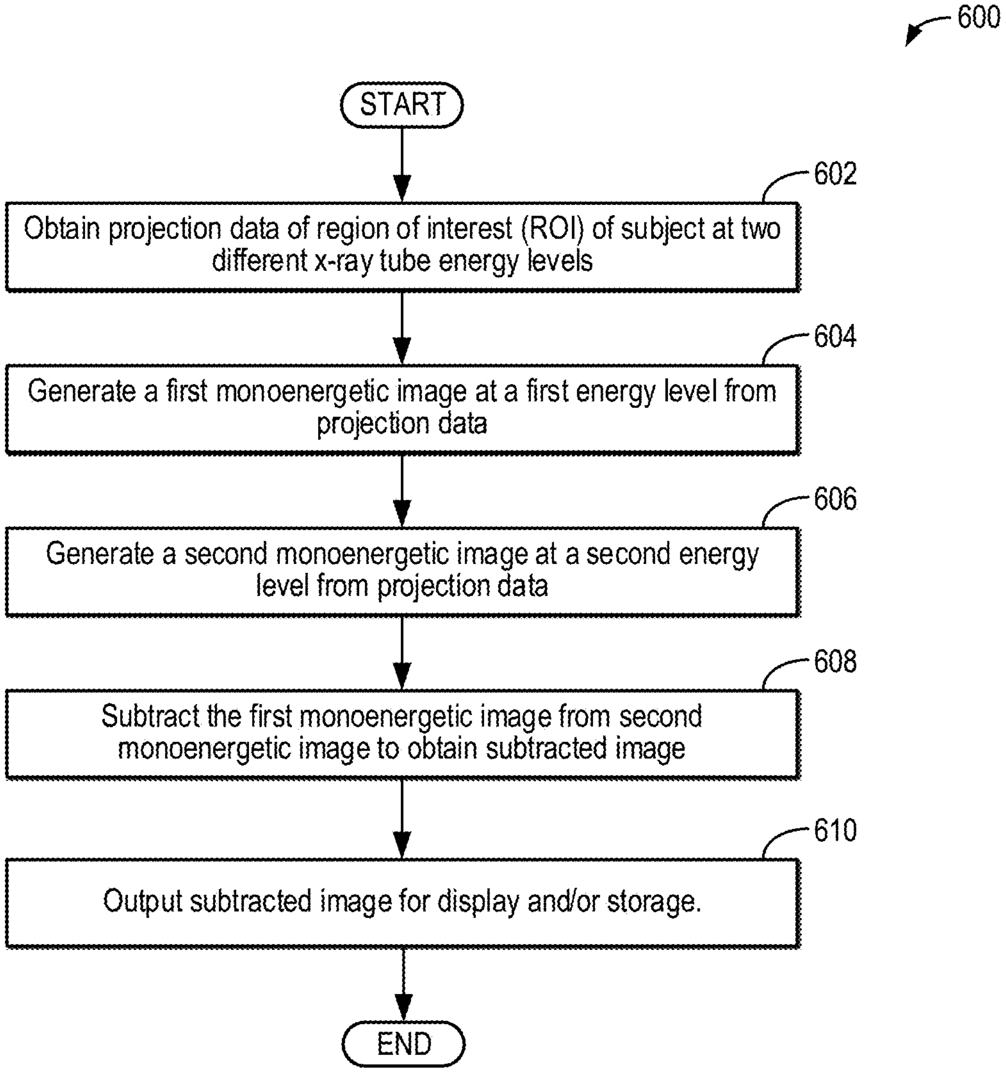
FIG. 6 is a flow chart illustrating an example method for generating a dual-energy subtraction image by subtracting two monoenergetic images at two different energy levels.
Figure 7:
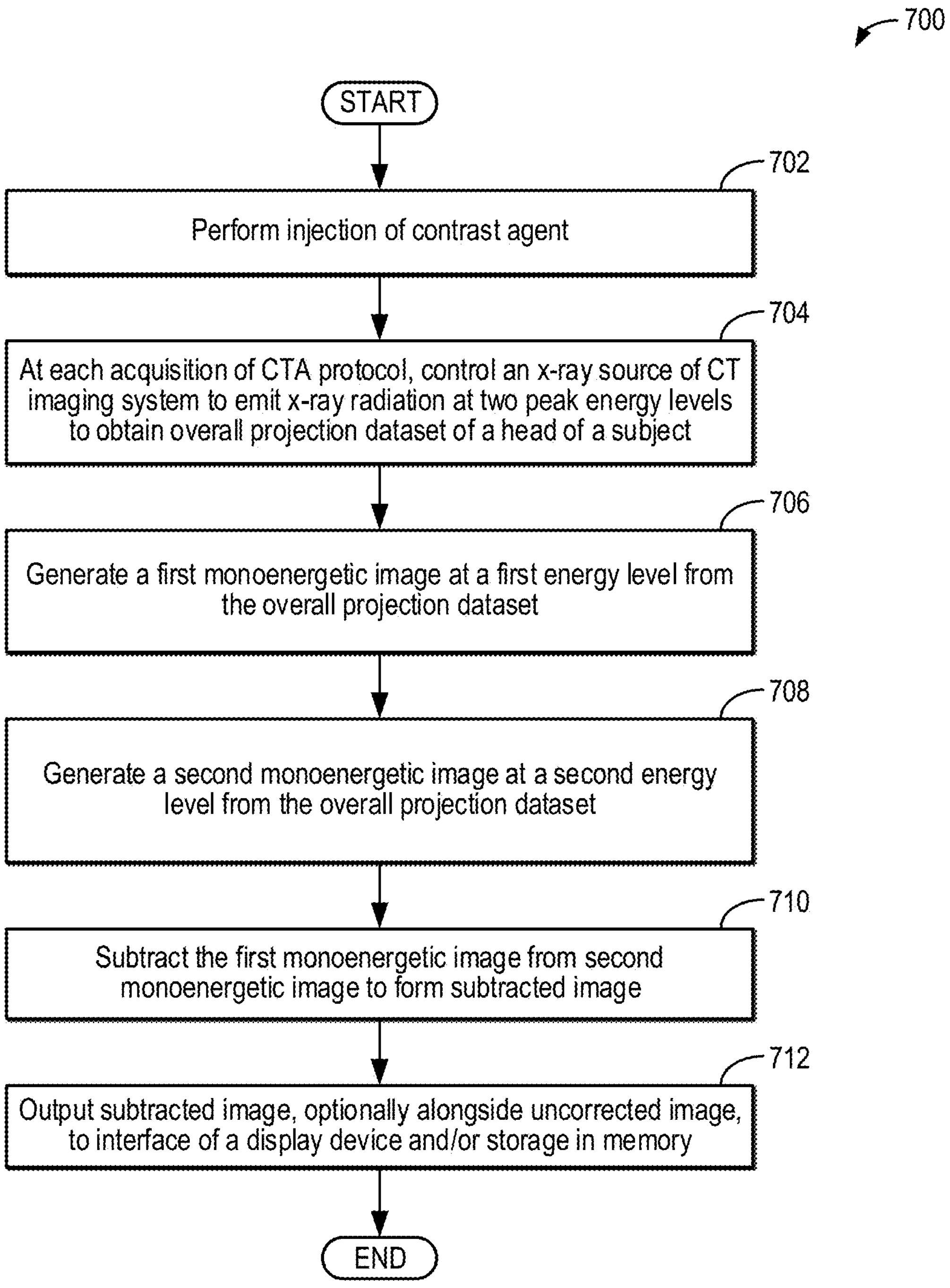
FIG. 7 is a flow chart illustrating an example method of a dual-energy CT angiography scan protocol.
Figure 8:
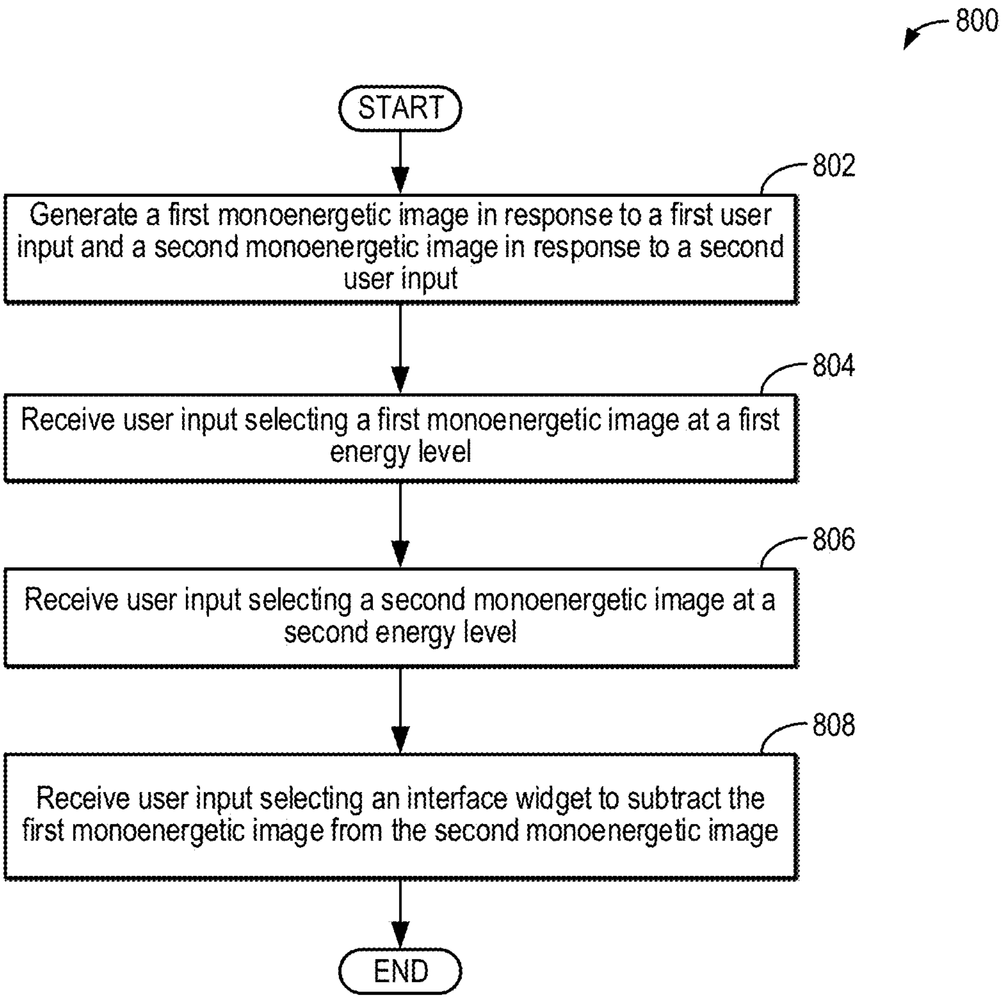
FIG. 8 is a flow chart illustrating an example method for subtracting two monoenergetic images at two different energy levels.
Figure 9:
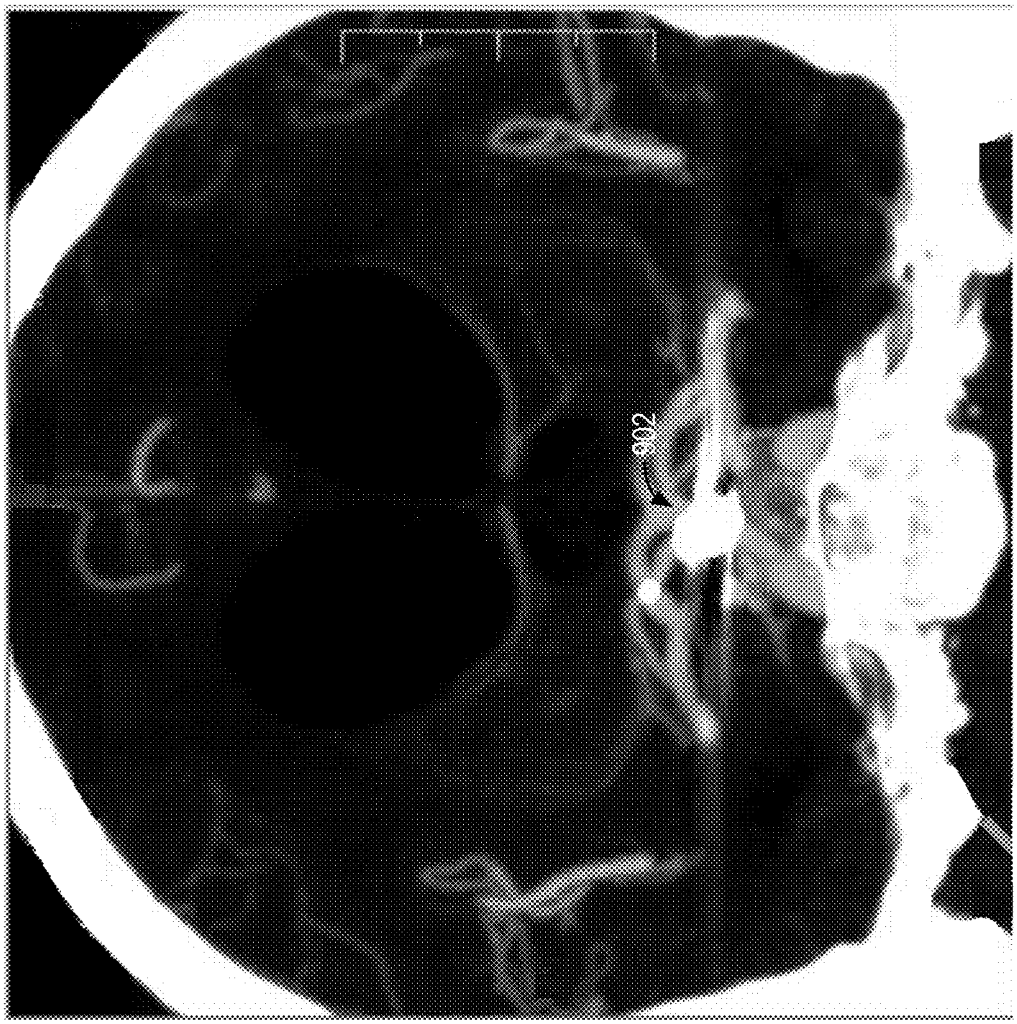
FIG. 9 shows an example uncorrected image of a coil positioned within a head of a subject.

An example medical imaging system that may be used to generate medical images is shown in FIGS. 1 and 2. In particular, FIGS. 1 and 2 show a computed tomography (CT) system, although it may be understood that the medical imaging data may be acquired via other imaging modalities in other examples that use an x-ray source. An example of a detector array is shown in FIG. 3. An example of a detector is shown in FIG. 4. An example process for reducing metal artifacts by subtracting two monoenergetic images is shown in FIG. 5. A method for reducing metal artifacts by subtracting two monoenergetic images is shown in FIG. 6, which may be implemented in a CT angiography protocol as shown in FIG. 7 to monitor a brain aneurism post-implantation of a coil, for example. A method for performing a subtraction of two monoenergetic images via a user interface is shown in FIG. 8. An uncorrected image with metal artifacts is shown in FIG. 9, with a corrected version of the image with reduced metal artifacts shown in FIG. 10. FIG. 11 illustrates a display output of a user interface configured to display an uncorrected image alongside a corrected image.

FIG. 1 illustrates an exemplary CT imaging system 100 configured for CT imaging. Particularly, the CT imaging system 100 is configured to image a subject 112, such as a patient, an inanimate object such as a phantom, one or more manufactured parts, and/or foreign objects such as dental implants, artificial joints, stents, and/or contrast agents present within the body. In one embodiment, the CT imaging system 100 includes a gantry 102, which in turn, may further include at least one x-ray source 104 configured to project a beam of x-ray radiation for use in imaging the subject 112. Specifically, the x-ray source 104 is configured to project the x-rays towards a detector array 108 positioned on the opposite side of the gantry 102. Although FIG. 1 depicts a single x-ray source 104, in certain embodiments, multiple x-ray sources and detectors may be employed to project a plurality of x-rays for acquiring, for example, projection data at different energy levels corresponding to the patient. In some embodiments, the x-ray source 104 may enable dual-energy spectral imaging by rapid peak kilovoltage (kVp) switching. In some embodiments, the x-ray detector employed is a photon-counting detector that is capable of differentiating x-ray photons of different energies. In other embodiments, the x-ray detector is an energy integrating detector in which the detected signal is proportional to the total energy deposited by all photons without specific information about each individual photon or its energy. In some embodiments, two sets of x-ray sources and detectors are used to generate dual-energy projections, with one set at low-kVp and the other at high-kVp. It should thus be appreciated that the methods described herein may be implemented with single energy acquisition techniques as well as dual energy acquisition techniques.

In certain embodiments, the CT imaging system 100 further includes an image processor unit 110 configured to reconstruct images of a target volume of the subject 112 using an iterative or analytic image reconstruction method. For example, the image processor unit 110 may use an analytic image reconstruction approach such as filtered back projection (FBP) to reconstruct images of a target volume of the patient. As another example, the image processor unit 110 may use an iterative image reconstruction approach such as advanced statistical iterative reconstruction (ASIR), conjugate gradient (CG), maximum likelihood expectation maximization (MLEM), model-based iterative reconstruction (MBIR), and so on to reconstruct images of a target volume of the subject 112. In some examples the image processor unit 110 may use an analytic image reconstruction approach such as FBP in addition to an iterative image reconstruction approach. In some embodiments, the image processor unit 110 may use a direct image reconstruction approach, such as using deep-learning trained neural networks.

In some CT imaging system configurations, the x-ray source 104 emits a cone-shaped beam which is collimated to lie within a plane of an X-Y-Z Cartesian coordinate system and generally referred to as an "imaging plane." The radiation beam passes through an object being imaged, such as the patient or subject 112. The beam, after being attenuated by the object, impinges upon the detector array 108 comprising radiation detectors. The intensity of the attenuated radiation beam received at the detector array 108 is dependent upon the attenuation of the radiation beam by the object. Each detector element of the array produces a separate electrical signal that is a measurement of the beam attenuation of a ray path between the source and the detector element. The attenuation measurements from all the detector elements are acquired separately to produce a transmission profile.

In some CT imaging systems, the radiation source and the detector array are rotated with a gantry within the imaging plane and around the object to be imaged such that an angle at which the radiation beam intersects the object constantly changes. A group of radiation attenuation measurements, e.g., projection data, from the detector array at one gantry angle is referred to as a "view." A "scan" of the object includes a set of views made at different gantry angles, or view angles, during one revolution of the radiation source and detector. It is contemplated that the benefits of the methods described herein accrue to medical imaging modalities other than CT, so as used herein the term "view" is not limited to the use as described above with respect to projection data from one gantry angle. The term "view" is used to mean one data acquisition whenever there are multiple data acquisitions from different angles, whether from a CT, a positron emission tomography (PET), a single-photon emission CT (SPECT) acquisition, and/or any other modality including modalities yet to be developed as well as combinations thereof in fused or hybrid embodiments.

The projection data is processed to reconstruct an image that corresponds to a two-dimensional slice taken through the object or, in some examples where the projection data includes multiple rotations or scans or two-dimensional (2D) arrays of detectors, a three-dimensional (3D) rendering of the object. One method for reconstructing an image from a set of projection data is referred to in the art as the filtered back projection technique. Transmission and emission tomography reconstruction techniques also include statistical iterative methods, such as maximum likelihood expectation maximization (MLEM) and ordered-subsets expectation-reconstruction techniques, as well as iterative reconstruction techniques. This process may convert the attenuation measurements from a scan into values called "CT numbers" or "Hounsfield units" (HU), which are used to control the brightness of a corresponding pixel on a display device.

To reduce the total scan time, a "helical" scan may be performed. To perform a "helical" scan, the patient is moved while the data for the prescribed number of slices are acquired. The position of the source with respect to the patient in such a system traces a helix. The helix mapped out by the source yields projection data from which images in each prescribed slice may be reconstructed.

As used herein, the phrase "reconstructing an image" is not intended to exclude embodiments of the present invention in which data representing an image are generated but a viewable image is not. Therefore, as used herein, the term "image" broadly refers to both viewable images and data representing a viewable image. However, many embodiments generate (or are configured to generate) at least one viewable image.

FIG. 2 illustrates an exemplary imaging system 200 similar to the CT imaging system 100 of FIG. 1. The imaging system 200 is configured for imaging the subject 112. In one embodiment, the imaging system 200 includes the detector array 108 (see FIG. 1). The detector array 108 further includes a plurality of detector elements 202 that together sense the x-ray beams that pass through the subject 112 (such as a patient) to acquire corresponding projection data. Accordingly, in one embodiment, the detector array 108 is fabricated in a multi-slice configuration including the plurality of rows of cells or detector elements 202. In such a configuration, one or more additional rows of the detector elements 202 are arranged in a parallel configuration for acquiring the projection data.

In certain embodiments, the imaging system 200 is configured to traverse different angular positions around the subject 112 for acquiring desired projection data. Accordingly, the gantry 102 and the components mounted thereon may be configured to rotate about a center of rotation 206 for acquiring the projection data, for example, at different energy levels. Alternatively, in embodiments where a projection angle relative to the subject 112 varies as a function of time, the mounted components may be configured to move along a general curve rather than along a segment of a circle.

As the x-ray source 104 and the detector array 108 rotate, the detector array 108 collects data of the attenuated x-ray beams. The data collected by the detector array 108 undergoes pre-processing and calibration to condition the data to represent the line integrals of the attenuation coefficients of the scanned subject 112. The processed data are commonly called projections.

In some examples, the individual detectors or detector elements 202 of the detector array 108 may include photon-counting detectors which register the interactions of individual photons into one or more energy bins. It should be appreciated that the methods described herein may also be implemented with energy-integrating detectors.

The acquired sets of projection data may be used for basis material decomposition (BMD). During BMD, the measured projections are converted to a set of material-density projections. The material-density projections may be reconstructed to form a pair or a set of material-density map or image of each respective basis material, such as bone, soft tissue, and/or contrast agent maps. The density maps or images may be, in turn, associated to form a volume rendering of the basis material, for example, bone, soft tissue, and/or contrast agent, in the imaged volume.

Once reconstructed, the basis material image produced by the imaging system 200 reveals internal features of the subject 112, expressed in the densities of two basis materials. The density image may be displayed to show these features. In traditional approaches to diagnosis of medical conditions, such as disease states, and more generally of medical events, a radiologist or physician may consider a hard copy or display of the density image to discern characteristic features of interest. Such features might include lesions, sizes and shapes of particular anatomies or organs, and other features that would be discernable in the image based upon the skill and knowledge of the individual practitioner.

In one embodiment, the imaging system 200 includes a control mechanism 208 to control movement of the components such as rotation of the gantry 102 and the operation of the x-ray source 104. In certain embodiments, the control mechanism 208 further includes an x-ray controller 210 configured to provide power and timing signals to the x-ray source 104. Additionally, the control mechanism 208 includes a gantry motor controller 212 configured to control a rotational speed and/or position of the gantry 102 based on imaging requirements.

In certain embodiments, the control mechanism 208 further includes a data acquisition system (DAS) 214 configured to sample analog data received from the detector elements 202 and convert the analog data to digital signals for subsequent processing. The DAS 214 may be further configured to selectively aggregate analog data from a subset of the detector elements 202. The data sampled and digitized by the DAS 214 is transmitted to a computer or computing device 216. In one example, the computing device 216 stores the data in a mass storage device or storage device 218. The storage device 218, for example, may include a hard disk drive, a floppy disk drive, a compact disk-read/write (CD-R/W) drive, a Digital Versatile Disc (DVD) drive, a flash drive, and/or a solid-state storage drive.

Additionally, the computing device 216 provides commands and parameters to one or more of the DAS 214, the x-ray controller 210, and the gantry motor controller 212 for controlling system operations such as data acquisition and/or processing. In certain embodiments, the computing device 216 controls system operations based on operator input. The computing device 216 receives the operator input, for example, including commands and/or scanning parameters via an operator console 220 operatively coupled to the computing device 216. The operator console 220 may include a user interface (not shown), which may include one or more of a keyboard, a touchscreen, a mouse, a trackpad, and the like to allow the operator to specify the commands and/or scanning parameters.

Although FIG. 2 illustrates one operator console 220, although more than one operator console may be coupled to the imaging system 200, for example, for inputting or outputting system parameters, requesting examinations, plotting data, and/or viewing images. Further, in certain embodiments, the imaging system 200 may be coupled to multiple displays, printers, workstations, and/or similar devices located either locally or remotely, for example, within an institution or hospital, or in an entirely different location via one or more configurable wired and/or wireless networks such as the Internet and/or virtual private networks, wireless telephone networks, wireless local area networks, wired local area networks, wireless wide area networks, wired wide area networks, etc.

In one embodiment, the imaging system 200 either includes, or is coupled to, a picture archiving and communications system (PACS) 224. In an exemplary implementation, the PACS 224 is further coupled to a remote system such as a radiology department information system, hospital information system, and/or to an internal or external network (not shown) to allow operators at different locations to supply commands and parameters and/or gain access to the image data.

The computing device 216 uses the operator-supplied and/or system-defined commands and parameters to operate a table motor controller 226, which, in turn, may control a table 114 (see FIG. 1) or 228 which may be a motorized table. Specifically, the table motor controller 226 may move the table 114 (see FIG. 1) or 228 for appropriately positioning the subject 112 in the gantry 102 for acquiring projection data corresponding to the target volume of the subject 112.

As previously noted, the DAS 214 samples and digitizes the projection data acquired by the detector elements 202. Subsequently, an image reconstructor 230 uses the sampled and digitized x-ray data to perform high-speed reconstruction. Although FIG. 2 illustrates the image reconstructor 230 as a separate entity, in certain embodiments, the image reconstructor 230 may form part of the computing device 216. Alternatively, the image reconstructor 230 may be absent from the imaging system 200, and instead, the computing device 216 may perform one or more functions of the image reconstructor 230. Moreover, the image reconstructor 230 may be located locally or remotely and may be operatively connected to the imaging system 200 using a wired or wireless network. Particularly, one exemplary embodiment may use computing resources in a "cloud" network cluster for the image reconstructor 230.

In one embodiment, the image reconstructor 230 stores the images reconstructed in the storage device 218. Alternatively, the image reconstructor 230 may transmit the reconstructed images to the computing device 216 for generating useful patient information for diagnosis and evaluation. In certain embodiments, the computing device 216 may transmit the reconstructed images and/or the patient information to a display or display device 232 communicatively coupled to the computing device 216 and/or the image reconstructor 230. In some embodiments, the reconstructed images may be transmitted from the computing device 216 or the image reconstructor 230 to the storage device 218 for short-term or long-term storage.

As shown in FIG. 3, detector array 300, which may be an embodiment of the detector array 108 of FIG. 1, includes rails 302 having collimating blades or plates 304 placed therebetween. Plates 304 are positioned to collimate x-rays 306 before such beams impinge upon, for instance, detector 400 of FIG. 4 positioned on detector array 300. In one embodiment, detector array 300 includes 57 detectors, each detector having an array size of 64×16 of detector elements. As a result, detector array 300 has 64 rows and 912 channels (16×57 detectors) which allows 64 slices of data to be collected with each rotation of gantry 102.

Referring to FIG. 4, detector 400 includes DAS 404, which may be an embodiment of DAS 214 of FIG. 2, with each detector 400 including a number of detector elements 402 arranged in pack 406. Detector 400 includes pins 408 positioned within pack 406 relative to detector elements 402. Pack 406 is positioned on a backlit diode array 410 having a plurality of diodes 412. Backlit diode array 410 is in turn positioned on multi-layer substrate 414. Spacers 416 are positioned on multi-layer substrate 414. Detector elements 402 are optically coupled to backlit diode array 410, and backlit diode array 410 is in turn electrically coupled to multi-layer substrate 414. Flex circuits 418 are attached to face 420 of multi-layer substrate 414 and to DAS 404. Detector 400 is positioned within detector array 308 by use of pins 408. In the operation of one embodiment, x-rays impinging within detector elements 402 generate photons which traverse pack 406, thereby generating an analog signal which is detected on a diode within backlit diode array 410. The analog signal generated is carried through multi-layer substrate 414, through flex circuits 418, to DAS 404 wherein the analog signal is converted to a digital signal. According to embodiments of the disclosure, CT imaging system 100 is operated to obtain CT images of a region-of-interest of a patient that includes a metal component. A medical image generated from projection data obtained when imaging a patient with the metal component may include beam hardening artifacts that conceal anatomical features of interest. For example, the metal component may include a coil inserted into a brain aneurysm and the presence of beam hardening objects in a medical image may render visualization of vessels around or within the coil difficult.

As set forth above, CT imaging system 100 operates as a dual-energy system, thereby providing for correction for the beam hardening and/or other artifacts caused by the metal component. CT imaging system 100 utilizes dual-energy scanning to obtain diagnostic CT images that enhance contrast separation within the image by acquiring data of the same locations at two different tube peak voltage levels (kVp). Using the images obtained during the dual energy CT scan, monochromatic images (also referred to as monoenergetic images) are generated. That is, a monochromatic image can be created at a desired energy level with each image being at a specific x-ray energy (keV). While embodiments of the disclosure described below describe generation of monochromatic images at two levels, it is recognized that monochromatic images can be created at a greater number of energy levels, such as three, four, or five energy levels, for example. Thus, embodiments of the disclosure are not limited to the acquiring and generating monochromatic images at two energy levels (e.g., a pair of "high" and "low" energy images), and discussion of such is not to be construed as such a limitation.

By utilizing dual energy CT, the effect of beam hardening artifact of the metal component can be minimized by looking at the same material at different virtual monochromatic energy levels. That is, high monochromatic energy levels reduce the intensity and corresponding beam hardening artifacts caused by the metal component. By obtaining an image at a high monochromatic energy level, the beam hardening artifacts of the metal component may be reduced when subtracted from an image obtained at a low monochromatic energy level, thus allowing for accurate visualization of the anatomical features surrounding and within the metal component.

FIG. 5 schematically shows a process 500 for generating a dual-energy subtraction image, thereby reducing metal artifacts in images by subtracting two images generated from projection data at two different energy levels, which may be performed by the computing device 216 of FIG. 2. The process 500 may include obtaining projection data with a dual-energy CT scan protocol, which is described in further detail in FIGS. 6 and 7. The projection data may be obtained when performing the dual-energy CT scan protocol on a region of interest (ROI) of a subject. The ROI may be an anatomical feature that, when scanned, causes beam hardening artifacts or metal artifacts to appear in an image generated from the projection data.

An uncorrected image 502 may be generated based on the projection data obtained during the dual-energy CT scan protocol. In some examples, the dual-energy CT scan protocol may be an angiography protocol that includes scanning a head of a subject after administration of contrast agent, wherein the subject includes a coil (e.g., a metal component) that was inserted in a vessel of the subject to treat a condition (e.g., an aneurysm). Hence, the uncorrected image 502 includes beam hardening artifacts due to the coil being scanned, which may render the uncorrected image 502 non-diagnostic and/or prevent the image from being used to monitor a current diagnosis of the subject. In some embodiments, the uncorrected image 502 may be a maximum intensity projection (MIP) at 70 keV.

The dual-energy CT scan protocol may acquire projection data at two different peak energy levels. More specifically, projection data is acquired by nearly simultaneously interleaving the two peak energy levels. However, each energy level includes a spectrum of energies centered at the respective peak. A first projection dataset at a lower energy level and a second dataset at a higher energy level may be extracted from the projection data to form a lower energy sinogram and a high energy sinogram. Material-density (MD) projection maps of basis materials are generated based on the lower energy sinogram and the higher energy sinogram. The MD projection maps may be reconstructed to generate basis material images, such as iodine and water images.

After noise filtering is applied to the iodine and water images, a first monoenergetic image 504 and a second monoenergetic image 506 may be generated based on linear combinations of the reconstructed basis material images at a single energy level between 40 keV and 140 keV. For example, the first monoenergetic image 504 may be generated from a first linear combination of the basis material images and the second monoenergetic image 506 may be generated from a second linear combination of the basis material images. The first monoenergetic image 504 is at a different energy level (e.g., 40 keV) than the second monoenergetic image 506 (e.g., 140 keV). The first monoenergetic image 504 may include significant beam hardening artifacts whereas the second monoenergetic image 506 may include reduced beam hardening artifacts when compared to the first monoenergetic image 504.

The subtraction of the two monoenergetic images may be performed in response to user input received at a user interface 508 of a display device of the computing device. In particular, the user interface 508 may include a combination panel having an operation area 510, an operation saving area 512, and a mode selection area 514. The mode selection area 514 may include a plurality of widgets (e.g., buttons). When user input is received at the plurality of widgets, the user interface performs a pre-determined action. User input may be received at the plurality of widgets when a user input device receives user input (e.g., via clicking a mouse or touchscreen). As one example, a button 522 may be configured to receive user input. In response to receiving user input at the button 522, a subtraction mode of the user interface 508 may be selected. After selecting the subtraction mode, a first image, such as the first monoenergetic image 504, may be selected in the operation area 510 when a first widget 516 receives user input. Additionally, a second image, such as the second monoenergetic image 506, may be selected in the operation area 510 when user input is received at a second widget 518. The second monoenergetic image 506 may be subtracted from the first monoenergetic image 504 when user input is received at a third widget 520 to generate a final image 524 of the subject. In other examples, the first and second images may be selected via input to the first widget 516 and the second widget 518 and the button 522 and/or third widget 520 may be selected to generate the final image. The final image 524 may be saved in memory when user input is received in an operation saving area 512. The final image 524 may be an image of the head of the subject with reduced metal artifacts relative to the uncorrected image 502. In some embodiments, an MIP image may be generated from the final image 524 with a multiplanar reconstruction application integrated in the image processing system.

FIG. 6 is a flowchart illustrating a method 600 for generating dual-energy subtraction images, according to an embodiment of the disclosure. Method 600 may be implemented with computing device 216 of FIG. 2. Method 600 may be carried out according to instructions stored in non-transitory memory and executed by one or more processors of a computing device, such as computing device 216 of FIG. 2.

At 602, the method 600 includes obtaining projection data of a region of interest (ROI) of a subject at two different x-ray tube energy levels. In some embodiments, the ROI may include a metal component inserted within or placed next to an anatomical part. Projection data may be obtained with a dual-energy computed tomography (CT) scan protocol at two different x-ray tube energy levels, which changes the peak and spectrum of energy of the incident photons comprising the emitted x-ray beams. The projection data may be obtained with the CT imaging system of FIGS. 1-4.

The scan protocol may include exposing the subject to radiation at a lower x-ray tube energy level and a higher energy x-ray tube energy level. In particular, exposure may be performed by fast switching (or fast kV switching) of the peak tube voltage of the x-ray source of the CT imaging system. In some embodiments, x-ray tube may be controlled to switch between energy levels of 80 kVp and 140 kVp. However, it is recognized that other suitable energy levels may also be selected based on which anatomical parts and features are being scanned.

The x-ray source energy levels may be interleaved as a function of the rotation angle and thus one gantry rotation around the subject is performed to acquire the projection data at the lower x-ray tube energy level and the higher x-ray tube energy level. In this way, projection data may be acquired without having to acquire projection data for each x-ray tube energy level separately (e.g., via the use of two x-ray tubes or two rotations of the gantry). As one example, during one rotation of the gantry, the energy level in the x-ray tube may switch between the lower x-ray tube energy level and the higher x-ray tube energy according to a timing scheme which simulates the subject being exposed to the lower x-ray tube energy level and the higher x-ray tube energy level at around the same time. In other words, the subject is exposed to the lower x-ray tube energy level for a short duration of time followed by the subject being exposed to the higher x-ray tube energy level for another short duration of time, which is repeated until the scan is completed.

When the x-ray tube is at the lower x-ray tube energy level, the subject is exposed to x-ray beams at the lower x-ray tube energy level and the x-ray beams are attenuated by the subject. The attenuated x-ray beams impinge on the detector elements of the detector, such as the detector 400 of FIG. 4. The detector elements may convert the impinging attenuated x-ray photons into an analog signal that may be processed and converted into an electrical signal by a DAS, such as the DAS described above with respect to FIGS. 1-4. The DAS may then transmit the electric signals to the computing device for processing and image reconstruction.

After exposing the subject to radiation at the lower x-ray tube energy level for the short duration of time, the x-ray source may switch from the lower x-ray tube energy to the higher x-ray tube energy level for the short duration of time. When the x-ray tube is at the higher x-ray tube energy level, the subject is exposed to x-ray beams at the higher x-ray tube energy level and the x-ray beams are attenuated by the subject. As described, the attenuated x-ray beams impinging on the detector elements of the detector may be converted to an analog signal by the detector element. The analog signals are then transmitted to the DAS where the analog signals are converted to an electrical signal, which may be transmitted to the computing device for processing and image reconstruction. After exposing the subject to radiation at the higher x-ray tube energy level, the x-ray source switches back to the lower x-ray tube energy level.

The exposure sequence continues until the gantry finishes a single rotation. In this way, projection data may be obtained when the subject is exposed to radiation at the higher x-ray tube energy level and the lower x-ray tuber energy level. Even though the subject is exposed to radiation at two different x-ray tube peak energy levels, projection data corresponding to various energy levels that are different from the two different x-ray tube peak energy levels is collected since the x-ray tube is polychromatic. It may be understood that the entirety of the projection data may be obtained after injection of a contrast agent.

At 604, the method 600 includes generating a first monoenergetic image at a first energy level from the projection data. As described herein, projection data for a spectrum of energy levels is obtained with the dual-energy CT scan protocol, forming an overall projection dataset. Projection data corresponding to a lower energy level, and projection data corresponding to a higher energy level may be extracted from the overall projection dataset to form a first projection dataset and second projection dataset, respectively. The first projection dataset and the second projection dataset may be sinograms.

Basis material decomposition (BMD) may be performed using the first projection dataset and the second projection dataset. During BMD, the measured projections are converted to a set of material-density projections. The material-density projections may be reconstructed to form a pair or a set of material-density map or images of each respective basis material, such as water and iodine. The density maps or images may be, in turn, associated to form a volume rendering of the basis material, for example, water and iodine. A linear combination of the material-density images may be used to generate monoenergetic images at a specific energy level with an image reconstructor, such as image reconstructor 230 of FIG. 2. For example, the first monoenergetic image at the first energy level may be generated based on a first linear combination of the material-density images.

In some embodiments, the first energy level may be 40 keV. However, in other embodiments, the first energy level may differ based on which anatomical parts and/or features are being scanned during the dual-energy CT scan protocol. Regardless of a value of the first energy level, the first energy level may be lower than a second energy level. Additionally, the first energy level is selected such that the first monoenergetic image generated includes image artifacts that significantly reduce image quality, such as beam hardening artifacts and/or metal artifacts. As such, it may be difficult to visualize anatomical parts or features positioned at or near the ROI in the first monoenergetic image.

At 606, the method 600 includes generating a second monoenergetic image at the second energy level from the projection data. The second monoenergetic image may be generated as explained above, using a second linear combination of the material-density images. In some embodiments, the second energy level may be 140 keV. Similar to the first energy level, the second energy level may differ based on which anatomical parts and/or features are being scanned and imaged during the dual energy CT scan protocol. Further, regardless of the value of the second energy level, the second energy level may be higher than the first energy level. The second energy level is selected such that the second monoenergetic image at the second energy level includes reduced image artifacts, such as beam hardening artifacts or metal artifacts. As such, it may be easier to visualize anatomical parts or features positioned at or near the ROI in the second monoenergetic image when compared with the first monoenergetic image.

At 608, the method 600 includes subtracting the first monoenergetic image from the second monoenergetic image to obtain a subtracted image. The subtraction may be performed in the image domain (e.g., the images themselves are subtracted on a pixel-wise basis). In some examples, the first monoenergetic image may be subtracted from the second monoenergetic image according to a method described below with regards to FIG. 8 (e.g., in response to user input received via a user interface). The subtracted image may be a final image with reduced image artifacts (e.g., beam hardening artifacts). Further, the subtracted image may not include the metal component inserted or placed next to the anatomical part and/or feature. In this way, it may be easier to visualize areas of the imaged subject, which may enable correct diagnoses and/or monitoring of current diagnoses.

At 610, the method 600 includes outputting the subtracted image for display and/or storage. The subtracted image may be displayed on a user interface of a display device. In some embodiments, the subtracted image may be displayed on the user interface alongside an uncorrected image generated from the overall projection dataset. The uncorrected image may be a monoenergetic image at a specific image level. In one example, the uncorrected image may be at 70 keV. In other embodiments, the subtracted image may be displayed alongside a metal artifact reduction (MAR)-corrected image generated from the overall projection dataset and corrected using a conventional metal artifact reduction method. The conventional MAR method may include using information from spectral energy data to segment regions of the detector, such as detector 400 of FIG. 4, that have photon starvation and metal artifacts, to remove the data from the segmented regions of the detector. After identification of the regions of the detector exhibiting photon starvation and metal artifacts, the metal artifacts may be corrected by replacing the missing data using iterative reconstruction methods, for example. It may be understood that in the present disclosure, MAR is not applied to the subtracted image.

An embodiment of the user interface is illustrated in FIG. 11. The display device may be a component of the operator console 220 communicatively coupled to a computing device and data acquisition system described above with respect to FIG. 2. In this way, a user may visually inspect the images displayed on the user interface to determine a diagnosis of the subject and/or monitor a current diagnosis of the subject. The method 600 then ends.

FIG. 7 is a flowchart illustrating a method 700 for correcting metal artifacts due to a coil positioned in a head of a subject, according to an embodiment of the disclosure. Method 700 may be implemented with computing device 216 of FIG. 2. Method 700 may be carried out according to instructions stored in non-transitory memory and executed by a processor of a computing device, such as computing device 216 of FIG. 2. The method 700 may be an example of the dual-energy subtraction method described above with respect to FIG. 6 implemented in a computed tomography angiography (CTA) protocol.

At 702, the method 700 includes performing an injection of a contrast agent. Prior to performing the CTA protocol to obtain projection data of a subject, the contrast agent may be administered to the subject. In particular, the injection of the contrast agent may be performed with intravenous injection. In other embodiments, the contrast agent may be administered orally and/or administered according to other methods. In some embodiments, the contrast agent may be iodine-based or barium-based. As described previously, the subject may include a metal component, such as a coil, positioned within a head of the subject, for example within an aneurysm of a brain of the subject. By imaging the head of the subject, the aneurysm may be monitored by visualizing the area and/or anatomical features at and near the coil.

At 704, the method 700 includes, at each acquisition of the CTA protocol, controlling an x-ray source of the CT imaging system to emit x-ray radiation at two peak energy levels to obtain an overall projection dataset of the head of the subject. The CTA protocol may include one or more acquisitions that occur at specified timepoints relative to the contrast uptake of the subject, such as a first acquisition at the arterial peak of contrast uptake and optionally one or more additional acquisitions at the venous peak and/or venous return to baseline of the contrast agent. In particular, instructions configured, stored, and executed in memory of the computing device by the one or more processors may cause the processor(s) to, for each acquisition, adjust a peak energy level of the x-ray source of the CT imaging system to a first peak energy for a first pre-determined amount of time. Following the first pre-determined amount of time, the processor(s) may adjust the peak energy level of the x-ray source to a second peak energy for a second pre-determined amount of time.

The peak energy level of the x-ray source may be adjusted between the first peak energy level for the first pre-determined amount of time and the second peak energy level for the second pre-determined amount of time for the duration of each rotation of the gantry. The first pre-determined amount of time and the second pre-determined amount of time may be selected such that the head of the subject is nearly simultaneously exposed to both the first peak energy level and the second peak energy level (e.g., the x-ray source may switch energy levels every millisecond or less). In this way, the head of a subject may be exposed to radiation of the x-ray source at both of the first peak energy level and the second peak energy level at around the same time.

The x-ray source of the CT imaging system may emit radiation that is polychromatic, meaning that although the x-ray source emits radiation at the first peak energy level and the second peak energy level, additional energy levels around the peaks are also emitted, and thus the projection data obtained includes information for various energy levels. The various energy levels are different from the first peak energy level and the second peak energy level. The projection data may be included as part of an overall projection dataset that encompasses projection data of a spectrum of energy levels. It may be understood that the entirety of the projection data is obtained after injection of the contrast agent.

At 706, the method 700 includes generating a first monoenergetic image at a first energy level from the overall projection dataset. The first monoenergetic image may be a contrast image generated from the overall projection dataset according to the method described with respect to FIG. 6, wherein a first projection dataset and a second projection dataset may be extracted by splitting the overall projection dataset into lower energy levels and higher energy levels (e.g., the first projection dataset may include the projections obtained when the x-ray source is operated at the lower peak energy level and the second projection dataset may include the projections obtained when the x-ray source is operated at the higher peak energy level), material decomposition is performed to generate two material basis images, for example, and the first monoenergetic image is generated by performing a first linear combination of the two material basis images.

At 708, the method 700 includes generating a second monoenergetic image at a second energy level from the overall projection dataset. The second monoenergetic image may be a contrast image generated from the overall projection dataset according to the method described with respect to FIG. 6, wherein material decomposition is performed to generate two material basis images, for example, and the second monoenergetic image is generated by performing a second linear combination of the two material basis images.

As described previously, the first and second energy levels are selected such that the second monoenergetic image includes reduced metal artifacts relative to the first monoenergetic image. In particular, image artifacts including beam hardening artifacts and/or metal artifacts associated with the high density coil may be present in the second monoenergetic image. However, when compared with the first monoenergetic image, the second monoenergetic image includes fewer metal artifacts. As such, it may be easier to visualize anatomical features of the brain positioned at the coil or near the coil in the second monoenergetic image compared to the first monoenergetic image. However, the extent of visualization of the anatomical features of the brain positioned at the coil or near the coil in the second monoenergetic image may not be suitable for monitoring the current diagnosis of the subject (e.g., the brain aneurysm).

At 710, the method 700 includes subtracting the first monoenergetic image from the second monoenergetic image to form a subtracted image. The subtraction may be performed in an image domain. In some examples, the first monoenergetic image may be subtracted from the second monoenergetic image according to the method described below with regards to FIG. 8 (e.g., in response to user input to a user interface). The subtracted image may be a final image with reduced image artifacts (e.g., beam hardening artifacts or metal artifacts). Further, the subtracted image may not include the coil inserted or placed next to an anatomical part. In this way, it may be easier to visualize areas, such as vessels or arteries, of the imaged subject, which to monitor a brain aneurysm. Although the method describes a process for generating a single subtracted image, the methods described herein may be used to generate one or more subtracted images for each acquisition of the CTA.

At 712, the method 700 includes outputting the subtracted image, optionally alongside an uncorrected image, to an interface of a display device and/or for storage in memory. Similar to FIG. 6, the subtracted image may be displayed on a user interface of a display device. In one embodiment, the subtracted image may be displayed on the user interface alongside an uncorrected image. In other embodiments, the subtracted image may be displayed alongside an image generated from a metal reduction method. An exemplary embodiment of the user interface is illustrated in FIG. 11. The display device may be a component of the operator console 220 communicatively coupled to a computing device and data acquisition system described above with respect to FIG. 2. In this way, a user may visually inspect the images displayed on the user interface to monitor the brain aneurysm. The method 700 then ends.

In one example, the coil in the brain may be the metal component inserted within or placed next to the anatomical brain that induces metal artifacts according to a duel-energy subtraction method described herein with respect to FIGS. 6 and 7. However, the dual-energy subtraction method may be applied to correct metal artifacts induced from other metal components and/or in other anatomical areas, such as pacemakers, stents, joint replacements, and the like, for example.

FIG. 8 is a flowchart illustrating a method 800 for subtracting two monoenergetic images at different energy levels, according to an embodiment of the disclosure. Method 800 may be implemented with computing device 216 of FIG. 2. Method 800 may be carried out according to instructions stored in non-transitory memory and executed by a processor of a computing device, such as computing device 216 of FIG. 2.

At 802, the method 800 includes generating a first monoenergetic image in response to a first user input and a second monoenergetic image in response to a second user input. The first monoenergetic image and the second monoenergetic image may be generated according to the methods described above with respect to FIGS. 6 and/or 7. More specifically, the first monoenergetic image at a first energy level and the second monoenergetic at a second energy may be generated from projection data of a scanned subject obtained according to the methods of FIGS. 6 and/or 7. Generation of the first monoenergetic image and the second monoenergetic image may occur in response to the first user input and the second user input being received at a user interface of a display device, such as the display device communicatively coupled to computing device 216 of FIG. 2. For example, the first user input may specify that a monoenergetic image at the first energy level be generated from the projection data and the second user input may specify that a monoenergetic image at the second energy level be generated from the projection data. Thus, the user input may include an indication/selection of the specific energy levels for the first and second monoenergetic images.

In some examples, the user interface may include a combination panel, wherein the user may select images to combine (e.g., add, subtract, etc.). After generating the first and second monoenergetic images, the user may select a user interface element to launch the combination panel (such as the combination panel/user interface 508 of FIG. 5) to facilitate selection of the monoenergetic images and subtraction thereof.

At 804, the method 800 includes receiving a user input to the user interface selecting the first monoenergetic image at the first energy level. The user interface of the image processing system (and more specifically, the combination panel) may include an operation area that includes a first interface widget. In response to user selection of the first interface widget, a first image may be selected, such as the first monoenergetic image. As explained previously, the first image may be obtained at a lower x-ray tube energy level and an extent of beam hardening artifacts and/or metal artifacts in the first image may be significant. User input may be received at the first interface widget via a user input device (e.g., via a touchscreen or mouse).

At 806, the method 800 includes receiving a user input at the user interface selecting a second monoenergetic image at the second energy level. Referring to the operation area described above, a second interface widget displayed in the operation area may receive user input. In response to reception of user input at the second interface widget, a second image may be selected, such as the second monoenergetic image, with reduced beam hardening artifacts and/or metal artifacts. As explained previously, the second image may be obtained at a higher x-ray tube energy level and an extent of beam hardening artifacts and/or metal artifacts in the second image may be reduced when compared with the first image. User input may be received at the second interface widget via a user input device (e.g., via a touchscreen or mouse).

At 808, the method 800 include receiving a user input selecting a third interface widget of the user interface (e.g., the display panel) to subtract the first monoenergetic image from the second monoenergetic image. The third interface widget may be displayed in the operation area and may receive user input to trigger subtraction of the first image and the second image. As one example, the third interface widget may be a button. User input may be received at the third interface widget via a user input device (e.g., via a touchscreen or mouse). Accordingly, the first monoenergetic image may be subtracted from the second monoenergetic image, and the subtracted image may be displayed on the user interface. The method 800 then ends.

Thus, method 800 described herein provides for generation of a dual-energy subtracted image in response to user input, wherein the user input specifies the generation of each of the first monoenergetic image at the first energy level, the second monoenergetic image at the second energy level, and the subtracted image. However, it may be understood that the subtracted image may be generated in various ways. For example, the first monoenergetic image, the second monoenergetic image, and the subtracted image may be generated automatically as part of a scan protocol, such that the subtracted image is generated and displayed without explicit user input. In another example, the subtracted image may be generated in response to user input requesting generation of the subtracted image, and the first monoenergetic image, the second monoenergetic image, and the subtracted image may be generated in response to the user request to generate the subtracted image. In this way, the first and second monoenergetic images may be generated without explicit user input (e.g., the computing device may know to generate the monoenergetic images at the specific energy levels in order to generate the subtracted image).

FIG. 9 illustrates an example of an uncorrected image 900 generated from an overall projection dataset obtained from a dual-energy CTA scan protocol. The uncorrected image 900 includes a head of a subject, or more specifically a brain of a subject. The uncorrected image 900 is not generated with metal artifact reduction (MAR) methods. A coil 902 is positioned in an aneurysm of the brain in the uncorrected image 900. Beam hardening artifacts in addition to metal artifacts are present in a bottom portion of the uncorrected image 900 wherein the coil 902 is positioned. It is difficult to visualize vessels positioned at the coil 902 and surrounding the coil. The method of FIG. 7 may be performed to correct the uncorrected image 900.

Figure 10:
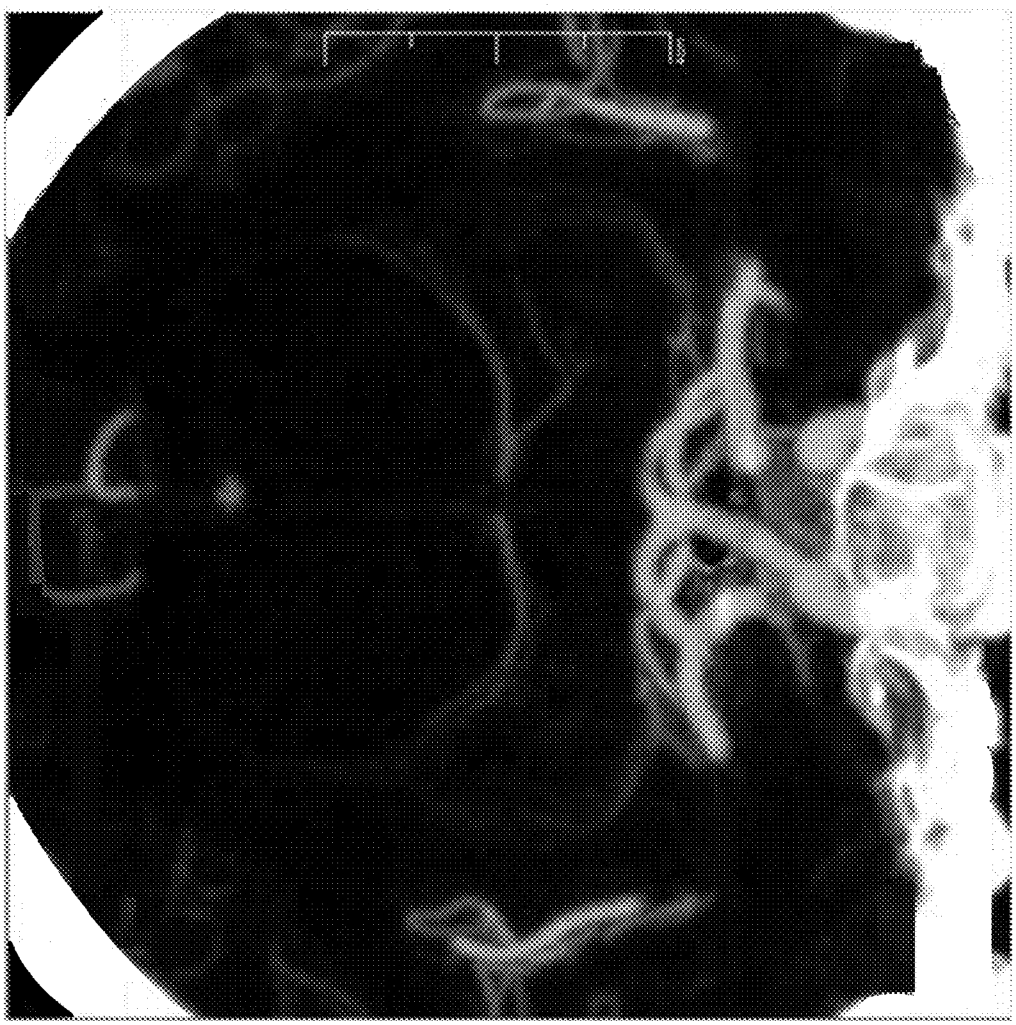
FIG. 10 shows an example corrected image of the coil positioned within the head of the subject of FIG. 9.
Figure 11:
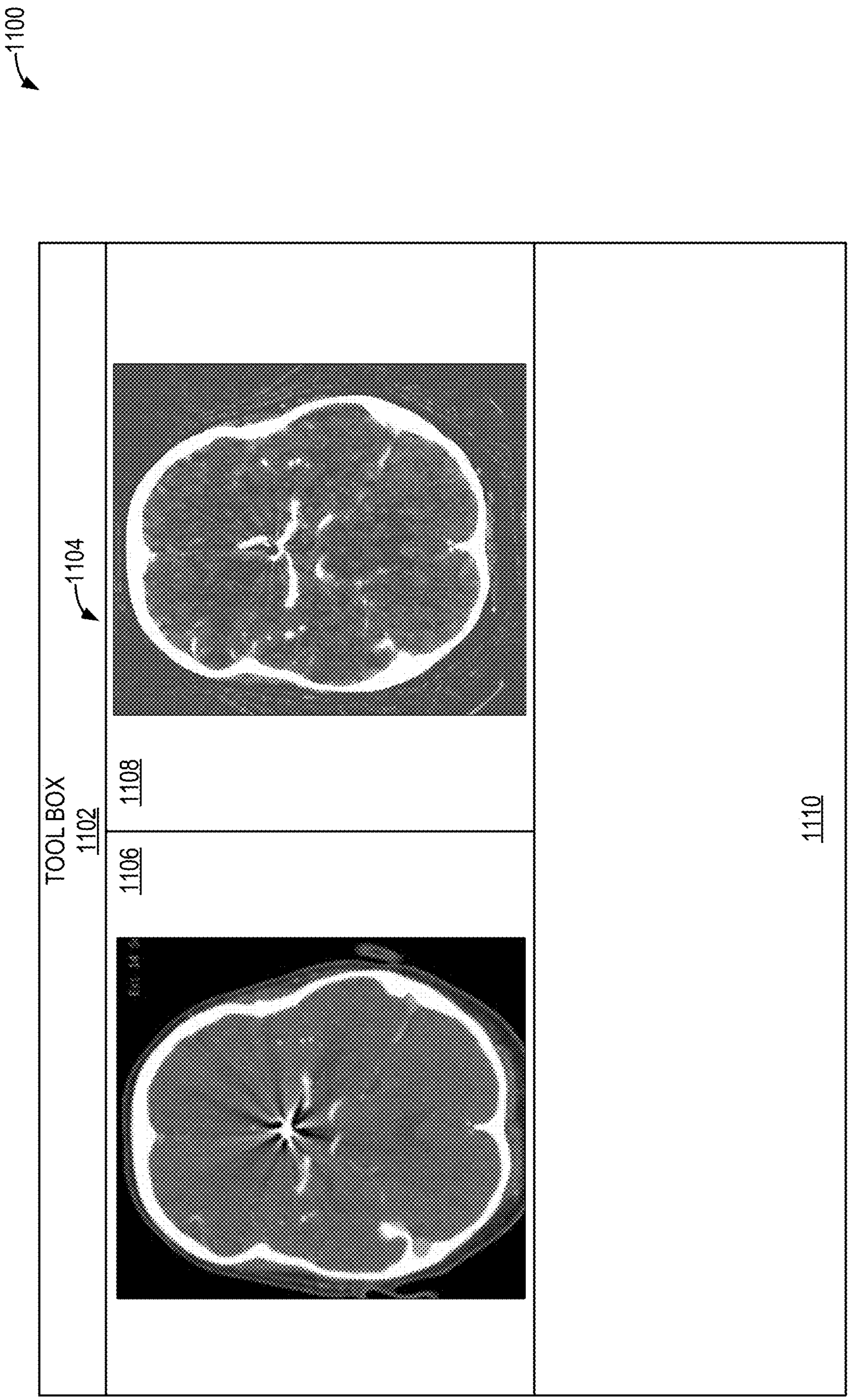
FIG. 11 shows an embodiment of a user interface of a CT imaging system including images with metal artifacts and reduced metal artifacts.

FIG. 10 illustrates an example of a corrected image 1000 generated by subtracting a first monoenergetic image at a first energy level and a second monoenergetic image at a second energy level. The corrected image 1000 includes the head of the subject, or the brain, of the subject of FIG. 9. The first monoenergetic image and the second monoenergetic image may generated from the overall projection dataset used to generate the uncorrected image 900. Beam hardening artifacts and metal artifacts are reduced in the corrected image 1000. Additionally, the coil 902 is not present in the bottom portion of the corrected image 1000, enabling visualization of vessels positioned at the coil 902 and surrounding the coil.

FIG. 11 shows an exemplary display output of a user interface 1100 configured to display a pair of images. The display output may be output on a display device, such as a display device communicatively coupled to an operator console 220 of FIG. 2. The user interface 1100 includes a tool box 1102 which may include visualization tools, selection tools, measuring tools, and annotation tools as some examples. The user interface 1100 further includes an image display area 1104 wherein an uncorrected image 1106 and a corrected image 1108 are displayed.

The uncorrected image 1106 is generated from projection data obtained with a dual-energy computed tomography angiography (CTA) scan protocol. The projection data includes data for a spectrum of energy levels. The uncorrected image 1106 is an image of a brain of a subject with significant beam hardening artifacts and metal artifacts. A coil is positioned within an aneurysm of the brain of the subject as shown in the uncorrected image 1106.

The corrected image 1108 is generated from a subtraction of a first monoenergetic image at a first energy level and a second monoenergetic image at a second energy level according to the embodiments described herein. The corrected image 1108 is the image of the brain of the subject without significant beam hardening artifacts and metal artifacts. A correction of the uncorrected image 1106 results in the generation of the corrected image 1108. Therefore, the coil is no longer visible in the corrected image 1108, which enables a user to visually identify and monitor vessels positioned at or surrounding the coil. In this way, the user may monitor a condition of an aneurysm in the brain.

The user interface 1100 may additionally include an image output area 1110. The image output area may include information regarding both of the uncorrected image 1106 and the corrected image 1108. In some embodiments, the information may be measurements. For example, the image output area 1110 may include attenuation coefficients for the uncorrected image 1106 and the corrected image.

It may be understood that the user interface 1100 may include more or fewer components and other configurations than that shown in FIG. 11, and FIG. 11 provide an illustrative example of the user interface 1100 including the uncorrected images and corrected images.

The technical effect of subtracting two monoenergetic images generated from projection data at two different energy levels is that beam hardening artifacts and metal artifacts due to a metal component may be reduced and/or are not visible in the subtracted image. In this way, anatomical features positioned at the metal component or near the metal component may be accurately visualized, enabling a medical professional to make an accurate diagnosis or monitor a current diagnosis.

The disclosure also provides support for a method for computed tomography (CT) imaging, comprising: obtaining projection data of a region of interest (ROI) of a subject, the projection data acquired at two different x-ray tube energy levels, generating a first monoenergetic image at a first energy level from the projection data, generating a second monoenergetic image at a second energy level from the projection data, subtracting the first monoenergetic image from the second monoenergetic image to obtain a subtracted image, and outputting the subtracted image for display and/or storage. In a first example of the method, the projection data is acquired at 80 kVp and 140 kVp. In a second example of the method, optionally including the first example, an entirety of the projection data is acquired following an injection of contrast agent to the subject. In a third example of the method, optionally including one or both of the first and second examples, the ROI includes a metal component. In a fourth example of the method, optionally including one or more or each of the first through third examples, the metal component is a coil. In a fifth example of the method, optionally including one or more or each of the first through fourth examples, the first energy level is 40 keV. In a sixth example of the method, optionally including one or more or each of the first through fifth examples, the second energy level is 140 keV.

The disclosure also provides support for an image processing system, comprising: one or more processors, and memory storing instructions executable by the one or more processors to: obtain projection data of a region of interest (ROI) of a subject, the projection data acquired at two different x-ray tube energy levels, generate a first monoenergetic image at a first energy level from the projection data, generate a second monoenergetic image at a second energy level from the projection data, subtract the first monoenergetic image from the second monoenergetic image to obtain a subtracted image, and output the subtracted image for display and/or storage. In a first example of the system, subtracting the first monoenergetic image from the second monoenergetic image to obtain the subtracted image comprises: receiving user input selecting the first monoenergetic image at a user interface displayed on a display device coupled to the image processing system, receiving user input selecting the second monoenergetic image at the user interface, and receiving user input selecting an interface widget at the user interface, wherein instructions are executable to subtract the first monoenergetic image from the second monoenergetic image in response to receiving the user input selecting the interface widget. In a second example of the system, optionally including the first example, the subtracted image is output on the user interface of the display device alongside an uncorrected image generated from the projection data.

The disclosure also provides support for a method for a computed tomography (CT) imaging system, comprising: upon injection of a contrast agent to a subject, executing a dual-energy CT angiography scan protocol to acquire projection data of a head of the subject, the head of the subject including a coil positioned therein, generating a first monoenergetic image at a first energy level from the projection data, generating a second monoenergetic image at a second energy level from the projection data, subtracting the first monoenergetic image from the second monoenergetic image to obtain a subtracted image, and outputting the subtracted image for display and/or storage. In a first example of the method, executing the dual-energy CT angiography scan protocol includes controlling an x-ray source of the CT imaging system to emit x-ray radiation at a first peak energy level and at a second peak energy level. In a second example of the method, optionally including the first example, the first peak energy level is 80 kVp and the second peak energy level is 140 kVp. In a third example of the method, optionally including one or both of the first and second examples, the first energy level is 40 keV and the second energy level is 140 keV.

In a fourth example of the method, optionally including one or more or each of the first through third examples, a first projection dataset and a second projection dataset are extracted from the projection data to generate a first material-density image and a second material-density image. In a fifth example of the method, optionally including one or more or each of the first through fourth examples, first monoenergetic image at the first energy level is generated based on a first linear combination of the first material-density image and the second material-density image. In a sixth example of the method, optionally including one or more or each of the first through fifth examples, the second monoenergetic image at the second energy level is generated based on a second linear combination of the first material-density image and the second material-density image. In a seventh example of the method, optionally including one or more or each of the first through sixth examples, the first peak energy level is different than the first energy level. In an eighth example of the method, optionally including one or more or each of the first through seventh examples, metal artifact reduction is not applied to the subtracted image. In a ninth example of the method, optionally including one or more or each of the first through eighth examples, outputting the subtracted image for display comprises outputting the subtracted image for display alongside an uncorrected image generated from the projection data.

As used herein, an element or step recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for computed tomography (CT) imaging, comprising:

upon injection of a contrast agent, obtaining projection data of a region of interest (ROI) of a subject via a dual energy CT angiography scan protocol, the projection data acquired at two different x-ray tube energy levels and the ROI comprising a metal component therein;

generating a first monoenergetic image at a first energy level from the projection data, wherein first monoenergetic image at the first energy level is generated based on a first linear combination of the first material-density image and the second material-density image;

generating a second monoenergetic image at a second energy level from the projection data;

subtracting the first monoenergetic image from the second monoenergetic image to obtain a subtracted image; and outputting the subtracted image for display and/or storage.

2. The method of claim 1, wherein the projection data is acquired at 80 kVp and 140 kVp.

3. The method of claim 2, wherein an entirety of the projection data is acquired following the injection of the contrast agent to the subject.

4. The method of claim 1, wherein the metal component is a coil.

5. The method of claim 1, wherein the first energy level is 40 keV.

6. The method of claim 1, wherein the second energy level is 140 keV.

7. An image processing system, comprising:

one or more processors; and memory storing instructions executable by the one or more processors to:

upon injection of a contrast agent, obtain projection data of a region of interest (ROI) of a head of a subject via a dual-energy computed tomography (CT) angiography scan protocol, the projection data acquired at two different x-ray tube energy levels, wherein the head of the subject comprises a coil positioned therein;

generate a first monoenergetic image at a first energy level from the projection data;

generate a second monoenergetic image at a second energy level from the projection data, wherein the second monoenergetic image at the second energy level is generated based on a second linear combination of the first material-density image and the second material-density image;

subtract the first monoenergetic image from the second monoenergetic image to obtain a subtracted image; and output the subtracted image for display and/or storage.

8. The system of claim 7, wherein subtracting the first monoenergetic image from the second monoenergetic image to obtain the subtracted image comprises:

receiving user input selecting the first monoenergetic image at a user interface displayed on a display device coupled to the image processing system;

receiving user input selecting the second monoenergetic image at the user interface; and receiving user input selecting an interface widget at the user interface, wherein instructions are executable to subtract the first monoenergetic image from the second monoenergetic image in response to receiving the user input selecting the interface widget.

9. The system of claim 8, wherein the subtracted image is output on the user interface of the display device alongside an uncorrected image generated from the projection data.

10. A method for a computed tomography (CT) imaging system, comprising:

upon injection of a contrast agent to a subject, executing a dual-energy CT angiography scan protocol via controlling an x-ray source of the CT-imaging system to emit x-ray radiation at a first peak energy level and a second peak energy level to acquire projection data of a head of the subject, the head of the subject including a coil positioned therein, wherein a first projection dataset and a second projection dataset are extracted from the projection data to generate a first material-density image and a second material-density image;

generating a first monoenergetic image at a first energy level from the projection data, wherein first monoenergetic image at the first energy level is generated based on a first linear combination of the first material-density image and the second material-density image;

generating a second monoenergetic image at a second energy level from the projection data;

subtracting the first monoenergetic image from the second monoenergetic image to obtain a subtracted image; and outputting the subtracted image for display and/or storage.

11. The method of claim 10, wherein the first peak energy level is 80 kVp and the second peak energy level is 140 kVp.

12. The method of claim 10, wherein the first energy level is 40 keV and the second energy level is 140 keV.

13. The method of claim 10, wherein the second mono-energetic image at the second energy level is generated based on a second linear combination of the first material-density image and the second material-density image.

14. The method of claim 10, wherein the first peak energy level is different than the first energy level.

15. The method of claim 10, wherein metal artifact reduction is not applied to the subtracted image.

16. The method of claim 10, wherein outputting the subtracted image for display comprises outputting the subtracted image for display alongside an uncorrected image generated from the projection data.

* * * * *